United States Patent
Sato

(10) Patent No.: US 8,634,091 B2
(45) Date of Patent: Jan. 21, 2014

(54) IMAGE PROCESSING SYSTEM, IMAGE PROCESSING METHOD, STORAGE MEDIUM, AND IMAGE FORMING APPARATUS AND EXTERNAL APPARATUS CONSTITUTING IMAGE PROCESSING SYSTEM

(75) Inventor: Hirochika Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 148 days.

(21) Appl. No.: 13/128,797

(22) PCT Filed: Mar. 16, 2011

(86) PCT No.: PCT/JP2011/057071
§ 371 (c)(1),
(2), (4) Date: May 11, 2011

(87) PCT Pub. No.: WO2011/115300
PCT Pub. Date: Sep. 22, 2011

(65) Prior Publication Data
US 2011/0317206 A1 Dec. 29, 2011

(30) Foreign Application Priority Data
Mar. 18, 2010 (JP) .................................. 2010-062542

(51) Int. Cl.
*G06F 3/12* (2006.01)
*G06F 15/16* (2006.01)

(52) U.S. Cl.
USPC ......................................... 358/1.15; 709/208

(58) Field of Classification Search
USPC ........................................................ 358/1.15
See application file for complete search history.

(56) References Cited

U.S. PATENT DOCUMENTS

2005/0108353 A1* 5/2005 Yamamoto ..................... 709/208
2010/0208300 A1* 8/2010 Kamasuka ..................... 358/1.15

FOREIGN PATENT DOCUMENTS

| JP | 2003-288336 A | 10/2003 |
| JP | 2006-134111 A | 5/2006 |
| JP | 2008-139981 A | 6/2008 |

OTHER PUBLICATIONS

International Search Report.

* cited by examiner

*Primary Examiner* — Twyler Haskins
*Assistant Examiner* — Henok Shiferaw
(74) *Attorney, Agent, or Firm* — Carter, DeLuca, Farrell & Schmidt LLP

(57) ABSTRACT

An image forming apparatus capable of being connected to an external apparatus through a network performs setting of processing to be executed in the image forming apparatus, receives from the external apparatus a web page for setting processing to be executed in the external apparatus, and displays the web page. Subsequently, the image forming apparatus transmits to the external apparatus an input value input by a user through the displayed web page, and receives an identifier associated with the input value from the external apparatus. The image forming apparatus transmits to the external apparatus the identifier and data to be executed in the processing in the external apparatus, and forms an image of data processed by the external apparatus according to the input value and processed by the image forming apparatus according to the setting.

9 Claims, 10 Drawing Sheets

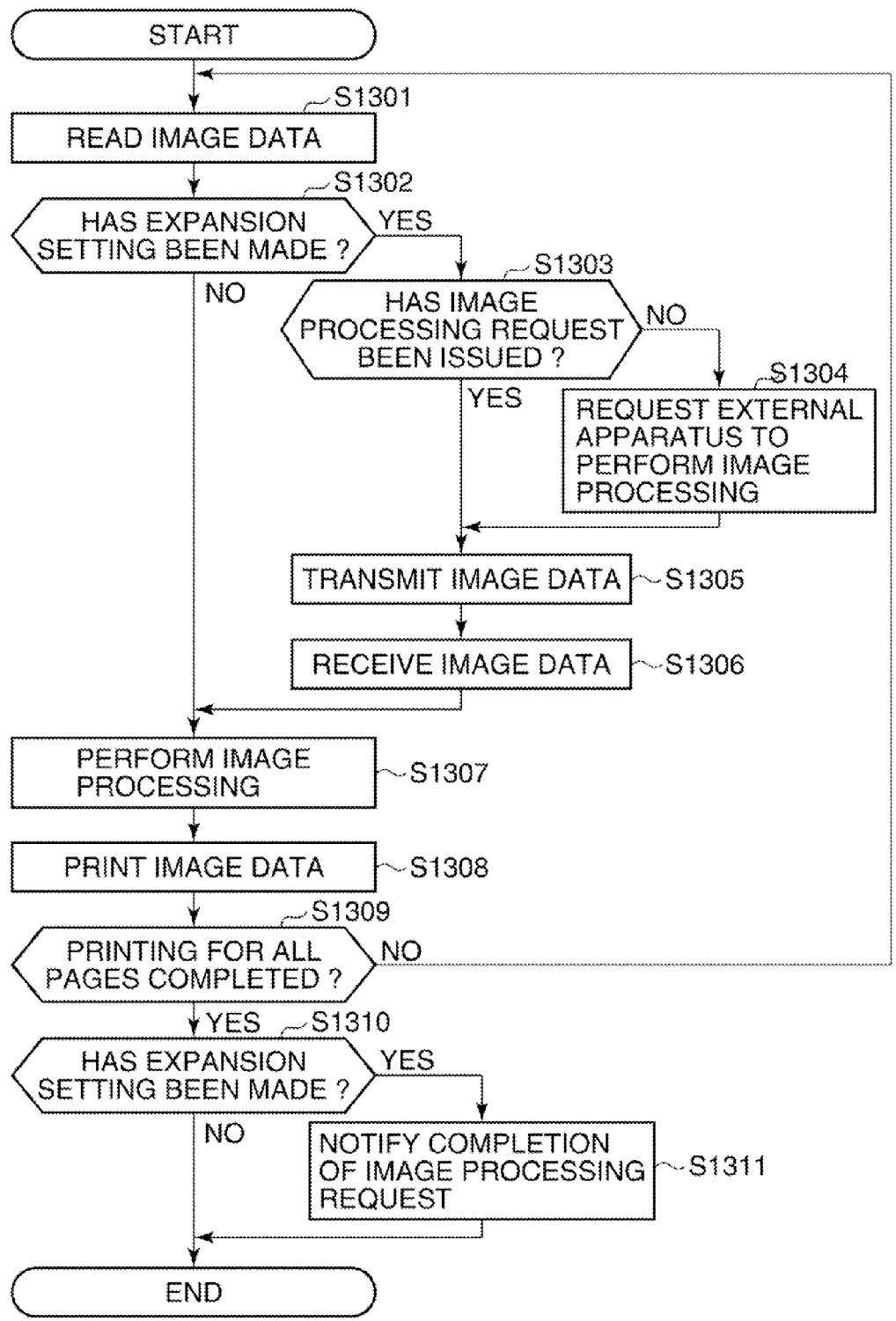

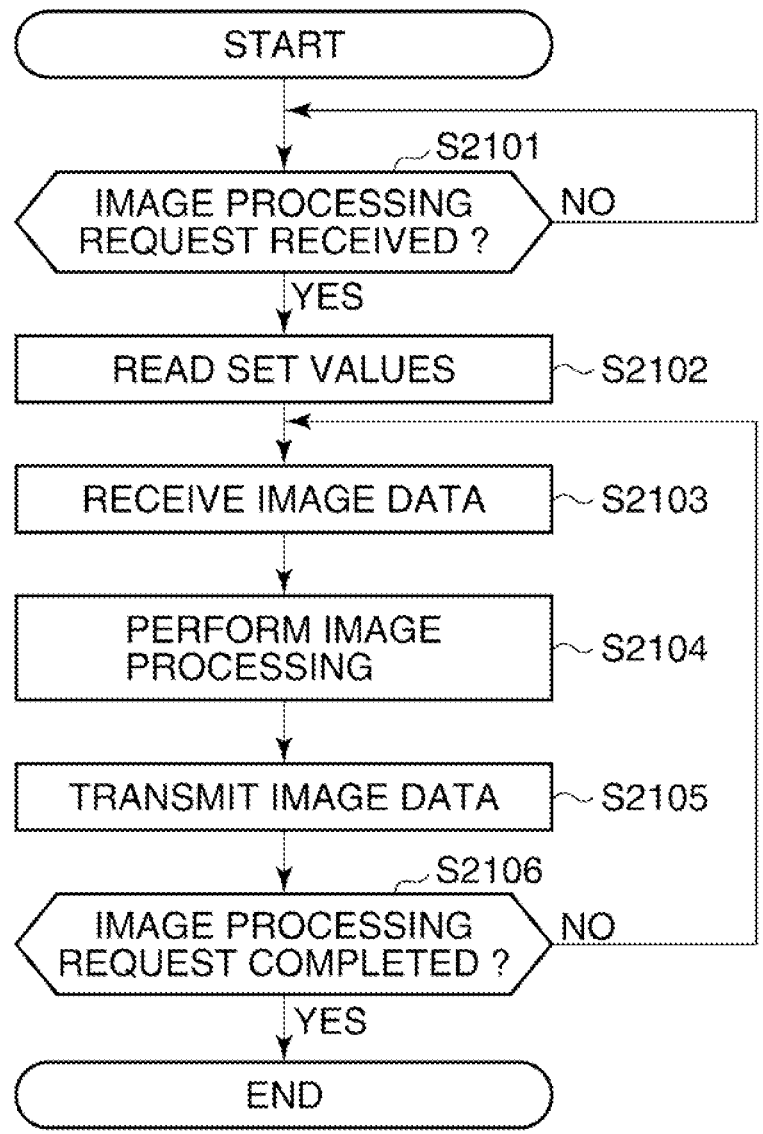

IMAGE PROCESSING SYSTEM, IMAGE PROCESSING METHOD, STORAGE MEDIUM, AND IMAGE FORMING APPARATUS AND EXTERNAL APPARATUS CONSTITUTING IMAGE PROCESSING SYSTEM

TECHNICAL FIELD

The present invention relates to an image processing system in which an image forming apparatus and an external apparatus are connected to each other, an image processing method executed in the image processing system, a storage medium storing a program for executing the method, and the image forming apparatus and the external apparatus constituting the image processing system.

BACKGROUND ART

Some image forming apparatus has various printing functions such as an N-in-1 printing function for collectively printing plural (N) original images on a sheet, an insertion function for inserting an insert sheet in between printing sheets, and a combining function for combining an original image with a particular image and outputting the combined image. Such image forming apparatus is singly capable of performing a printing process while combining these printing functions.

A printing system has also been proposed that realizes a printing function not provided by an image forming apparatus by using an external apparatus (see PTLs 1 and 2, described below).

With a technique described in PTL 1, when an instruction to perform 2-in-1 copy is given by a user through an operation panel of an image forming apparatus, the image forming apparatus transmits a request for 2-in-1 copy and image data of an input original to an external apparatus. In response to this, the external apparatus performs 2-in-1 processing to create image data for print and transmits the created image data to the image forming apparatus. Based on the image data for print, the image forming apparatus performs a printing process.

With a technique disclosed in PTL 2, a web page provided in an external apparatus is displayed on an operation panel of an image forming apparatus, and according to operations on the displayed web page, various applications running on the external apparatus are operable in cooperation with an image forming program running on the image forming apparatus. In a case, for example, that a translation application runs on the external apparatus, required parameters are input by a user to the web page displayed on the operation panel. Subsequently, the translation application instructs the image forming apparatus to create a scan job. The image forming apparatus reads and transmits an original image to the external apparatus. The translation application on the external apparatus performs OCR processing and translation processing on the original image received from the image forming apparatus, and instructs the image forming apparatus to create a print job. The image forming apparatus prints image data received from the external apparatus.

With the technique described in PTL 1, however, a screen resource used by the operation unit for display and a program being operable in cooperation with the image processing function of the external apparatus to control the operation unit are stored in a storage unit of the image forming apparatus, posing a problem that it is necessary to upgrade versions of the program and the screen resource of the image forming apparatus each time the image processing function of the external apparatus is version-upgraded.

With the technique described in PTL 2, applications and screen resources for inputting parameters into the applications are stored in a storage unit of external apparatus, and therefore the applications and screen resources can be version-upgraded independently of upgrading of versions of programs for the image forming apparatus. However, image processing functions such as a translation function are solely realized by the external apparatus, which poses a problem that these image processing functions cannot be combined with a printing function of the image forming apparatus.

CITATION LIST

Patent Literature

{PTL 1} Japanese Laid-open Patent Publication No. 2003-288336
{PTL 2} Japanese Laid-open Patent Publication No. 2008-139981

SUMMARY OF INVENTION

Technical Problem

The present invention provides an image processing system capable of independently upgrading versions of programs for an image forming apparatus and for an external apparatus and capable of performing a process in which functions of the image forming apparatus and the external apparatus are combined, and provides an image processing method executed in the image processing system, a storage medium storing a program for executing the image processing method, and an image forming apparatus and an external apparatus that constitute the image processing system.

Solution to Problem

Accordingly, a first aspect of this invention provides an image forming apparatus configured to be capable of being connected with an external apparatus through a network, which comprises a setting unit configured to perform setting of processing to be executed in the image forming apparatus, a reception unit configured to receive from the external apparatus a web page for setting processing to be executed in the external apparatus, a display unit configured to display the web page received by the reception unit, a first transmission unit configured to transmit to the external apparatus an input value input by a user through the web page displayed by the display unit, an identifier reception unit configured to receive from the external apparatus an identifier associated with the input value, a second transmission unit configured to transmit, to the external apparatus, data to be executed in the processing in the external apparatus and the identifier received by the identifier reception unit, and an image forming unit configured to form an image of the data processed by the external apparatus according to the input value and processed by the image forming apparatus according to the setting performed by the setting unit.

Accordingly, a second aspect of this invention provides an external apparatus configured to be capable of being connected with an image forming apparatus through a network, which comprises a request reception unit configured to receive a web page request from the image forming apparatus, a web page transmission unit configured, in a case where the request reception unit receives the web page request, to transmit to the image forming apparatus a web page for performing setting of processing to be executed by the external apparatus, a storage unit configured, when an input value input by a user to the image forming apparatus through the web page is received from the image forming apparatus, to store the input value in association with a predetermined identifier, an identifier transmission unit configured to transmit the identifier to the image forming apparatus, a data reception unit configured to receive from the image forming apparatus the identifier and data to be executed in the processing in the external apparatus, a processing unit configured to process the data received by the data reception unit based on the input value associated with the identifier, and a data transmission unit configured to transmit the data processed by the processing unit to the image forming apparatus.

Accordingly, a third aspect of this invention provides an image processing system comprising the image forming apparatus described in the first aspect and the external apparatus described in the second aspect.

Accordingly, a fourth aspect of this invention provides an image processing method performed by the image processing apparatus described in the first aspect.

Accordingly, a fifth aspect of this invention provides an image processing method performed by the external apparatus described in the second aspect.

Accordingly, a sixth aspect of this invention provides an image processing method performed by the image processing system described in the third aspect.

Accordingly, a seventh aspect of this invention provides a storage medium storing a program for executing the image processing method described in the fifth aspect.

Accordingly, an eighth aspect of this invention provides a storage medium storing a program for executing the image processing method described in the sixth aspect.

The features and advantages of the invention will become more apparent from the following detailed description taken in conjunction with the accompanying drawings.

Advantageous Effects of Invention

According to the present invention, it is possible to independently upgrade versions of programs for the image forming apparatus and the external apparatus and to perform a printing process while combining printing functions of the image forming apparatus and the external apparatus.

BRIEF DESCRIPTION OF DRAWINGS

FIG. 3 Views schematically showing image processing for image movement that can be performed in the image processing system, wherein

FIG. 4 Views schematically showing image processing for page print/image combining that can be performed in the image processing system, wherein

FIG. 9 A flowchart showing procedures of an output task performed in the job setting process shown in FIG. 5.

FIG. 10 A flowchart showing image processing performed by the external apparatus based on second job set values.

DESCRIPTION OF EMBODIMENTS

In the following, one embodiment of this invention will be described in detail with reference to the appended drawings.

Figure 1:
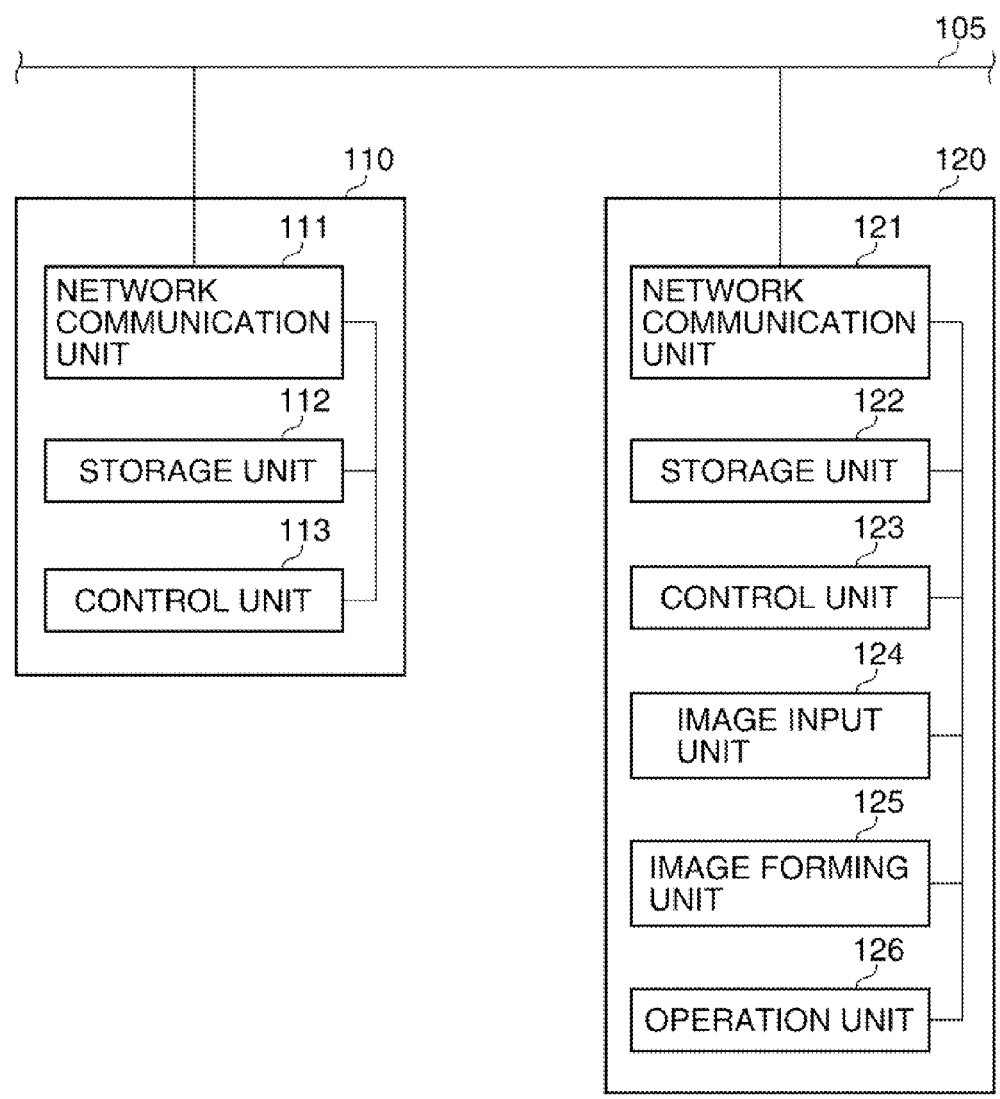
FIG. 1 A block diagram showing the entire construction of an image processing system according to an embodiment of this invention.

FIG. 1 shows in block diagram the entire construction of an image processing system according to an embodiment of this invention. The image processing system of this embodiment includes an external apparatus 110 and an image forming apparatus 120, which are connected for communication with each other via a network 105. The network 105 can be implemented by wired LAN, wireless LAN, Internet, or the like.

The external apparatus 110 is typically implemented by a desktop personal computer (PC) or a notebook PC, and includes a network communication unit 111, storage unit 112, and control unit 113. The external apparatus 110 includes, as hardware, a CPU, ROM, RAN, HDD, network interface, input devices (such as a keyboard and mouse), and display device (such as a liquid crystal display), none of which are illustrated.

The network communication unit 111 transmits and receives image data, web pages, etc. to and from the image forming apparatus 120 via the network interface. The storage unit 112 is implemented by a ROM, RAM, HDD, etc., and stores various programs for use by the external apparatus 110 to execute various functions of the apparatus 110 and various information such as web page contents, image data, and job set values. The control unit 113 performs overall control of operations of the external apparatus 110 by executing control programs read from the storage unit 112.

The following processing, for example, is performed between the control unit 113 of the external apparatus 110 and the image forming apparatus 120. When receiving a request for transmission of a web page from the image forming apparatus 120, the control unit 113 receives from the image forming apparatus 120 image data and job set values input into a web page displayed on an operation unit 126 of the image forming apparatus 120 (hereinafter, referred to as the second job set values), and stores them into the storage unit 112. Then, the control unit 113 performs image processing on the received image data according to the second job set values to thereby create image data, and transmits the created image data to the image forming apparatus 120 via the network communication unit 111. The details of these processing will be described later.

For the communication between the external apparatus 110 and the image forming apparatus 120, communication methods can be used such as an HTTP communication method suited to transmission and reception of web page request and web page and a SOAP communication method suited to transmission and reception of control instructions.

The image forming apparatus 120 includes a network communication unit 121, storage unit 122, image input unit 124, image forming unit 125, and operation unit 126, and includes a control unit 123 for controlling these units. The image forming apparatus 120 includes, as information processing hardware, a CPU, ROM, RAM, HDD, network interface, operation keys, touch panel, etc., none of which are shown.

The network communication unit 121 transmits and receives image data, web pages, etc. to and from the external apparatus 110 via the network interface. The storage unit 122 includes a ROM, RAM, and HDD, an stores image data, screen resources, job set values, etc.

The image input unit 124 includes a scanner for reading an image of an original using a photoelectric converter element such as a CCD. Data of the read image is temporarily stored into the storage unit 122. Based on the image data, the image forming unit 125 forms (e.g., photoelectrically) an image on a recording medium such as a recording sheet. The operation unit 126 includes a display device having a touch panel function, and includes input keys such as ten-key buttons. The display device is able to not only display a web page received from the external apparatus 110, but also display, e.g., a job setting screen for the image forming apparatus 120. According to operations on the job setting screen, settings of operations of the image forming apparatus 120 can be performed and a job execution instruction can be given.

The control unit 123 performs overall control of operations of the image forming apparatus 120 by executing a control program read from the storage unit 122. For example, the control unit 123 causes the operation unit 126 to display a job setting screen different from a web page display screen, and stores into the storage unit 122 job set values entered through the job setting screen (hereinafter, referred to as the first job set values).

The following processing is performed between the control unit 123 and the external apparatus 110. When receiving a web page from the external apparatus 110 via the network communication unit 121, the control unit 123 causes the operation unit 126 to display the web page. When a second job set value is input to the displayed web page, the control unit 123 transmits the second job set value to the external apparatus 110 via the network communication unit 121. When receiving a print start instruction from the operation unit 126, the control unit 123 stores image data read by the image input unit 124 into the storage unit 122, and transmits the image data to the external apparatus 110 via the network communication unit 121. When receiving image data from the external apparatus 110 via the network communication unit 121, the control unit 123 stores the received image data into the storage unit 122.

In a case that a first job set value relating to image data read by the image input unit 124 is input to the job setting screen displayed on the operation unit 126, the control unit 123 performs image processing on the image data according to the first job set value, and transmits the processed image data to the external apparatus 110 via the network communication unit 121. On the other hand, in a case that image data is read by the image input unit 124, is transmitted to the external apparatus 110, and is image-processed by the external apparatus 110 according to second job set values, the control unit 123 is able to receive the image data from the external apparatus 110 via the network communication unit 121 and perform image processing on the received image data according to first set values.

Figure 2:
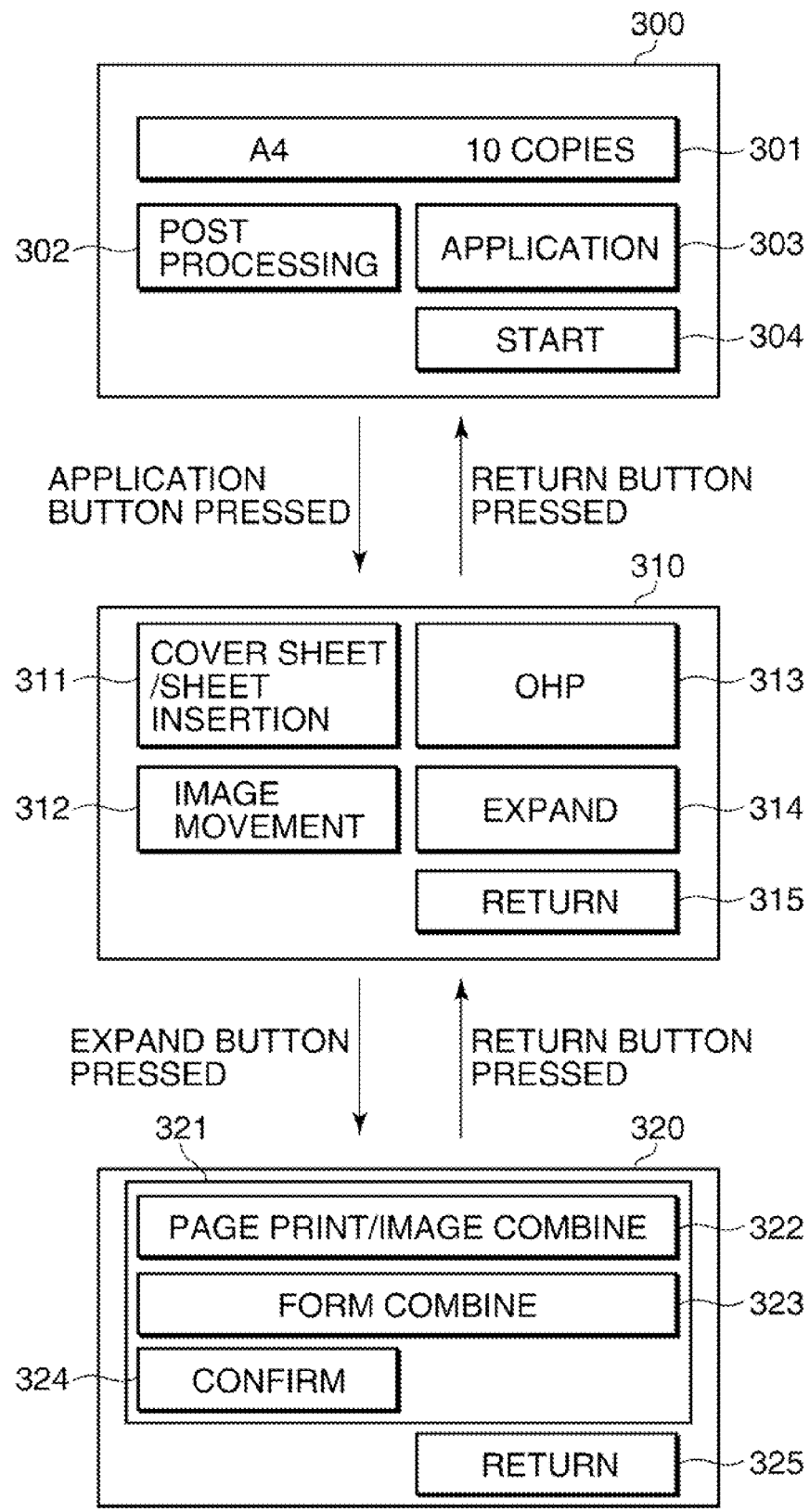
FIG. 2 A view showing an example of a job setting screen displayed on an operation unit of an image forming apparatus of the image processing system.

FIG. 2 shows an example of the job setting screen displayed on the operation unit 126 of the image forming apparatus 120. In FIG. 2, reference numeral 300 denotes a base screen displayed on the operation unit 126 under the control of the control unit 123 before execution of printing. In a "sheet size/number of copies" display field 301 of the base screen 300, the sheet size and the number of copies of print are displayed, which are respectively set by a user on a sheet selection screen (not shown) using ten-key buttons (not shown). In the illustrated example, A4 sheet size and ten copies of print are specified in the display field 301. Reference numeral 302 denotes a post-processing button for setting post-processing such as sorting and stapling. When the post-processing button 302 is pressed, a post-processing setting screen (not shown) is displayed on which the details of contents of post-processing can be set. Reference numeral 303 denotes an application button 303 for displaying an application mode screen 310, which is a first job set value setting screen, and 304 denotes a start button for starting a print job. When the start button 309 is pressed, the control unit 123 starts a print job.

Reference numeral 310 denotes the application mode screen displayed on the operation unit 126 by the control unit 123 by reading a screen resource from the storage unit 122. On the application mode screen 310, a job setting for image data input from the image input unit 124 can be performed.

Reference numerals 311, 312, and 313 respectively denote a cover sheet/sheet insertion button, image movement button, and OHP button, which are used to make job settings to set first job set values. When detecting that any of these buttons is pressed, the control unit 123 reads a screen resource corresponding to the pressed button from the storage unit 122 and causes a corresponding screen to be displayed on the display unit 126.

When the cover sheet/sheet insertion button 311 is pressed, a cover sheet/sheet insertion setting screen (not shown) is displayed on which, e.g., whether or not a cover sheet should be added can be set and page numbers between which an insert sheet should be inserted can be set. When the image movement button 312 is pressed, there is displayed an image movement setting screen (not shown) on which it is possible to set, e.g., at which of the center, upper right, upper left, lower right, and lower left of the sheet the image data should be positioned for print. When the OHP button 313 is displayed, there is displayed an OHP setting screen (not shown) on which it is possible to set, e.g., whether or not insert sheets should be output in blank and whether or not image data which are the same as those printed on OHP sheets should be printed on insert sheets when OHP sheets are printed. These first job set values are stored into the storage unit 122 by the control unit 123.

If an expand button 314 is pressed in a state where the application mode screen 310 is displayed, the application mode screen 310 is changed over to an expansion mode screen 320. When a return button 315 is pressed, the base screen 300 is displayed again.

The expansion mode screen 320 has a browser screen 321, which is a second job set value setting screen. On the browser screen 321, there is displayed a web page received by the control unit 123 from the external apparatus 110. On the browser screen 321, it is possible to set an image processing job to be performed by the control unit 113 of the external apparatus 110 on image data transmitted from the image forming apparatus 120 to the external apparatus 110.

A web page is displayed on the browser screen 321 (web page screen) as follows. When detecting that the expand button 314 is pressed, the control unit 123 of the image forming apparatus 120 reads and executes a web browser stored in the storage unit 122, and requests the external apparatus 110 to transmit a web page to be displayed on the browser screen 321. The control unit 113 of the external apparatus 110 reads the specified web page from the storage unit 112 and transmits it to the image forming apparatus 120.

The control unit 123 of the image forming apparatus 120 causes the received web page to be displayed on the browser screen 321.

When detecting a user's input into the browser screen 321 (web page screen), the control unit 123 of the image forming apparatus 120 transmits input information to the control unit 113 of the external apparatus 110 by using HTTP. The control unit 113 of the external apparatus 110 transmits a web page corresponding to the received input information to the image forming apparatus 120, and stores the input information into the storage unit 112. The control unit 123 of the image forming apparatus 120 causes the operation unit 126 to display the browser screen 321 that includes buttons for setting second job set values, such as a page print/image combine button 322 and a form combine button 323.

When the page print/image combine button 322 is pressed, there is displayed a web page (not shown) which is a page print/image combine setting screen on which it is possible to set, e.g., whether or not page numbers should be combined with image data and what font size and what color should be used for the page numbers if combined with the image data. When the form combine button 323 is pressed, there is displayed a web page (not shown) for a form combine setting screen on which it is possible to set a form image which should be combined with image data to be transmitted from the image forming apparatus 120 to the external apparatus 110. These second job set values are stored into the storage unit 112 of the external apparatus 110. When a confirm button 324 is pressed, the second job set values are fixedly determined in the external apparatus 110. When a return button 325 is pressed, the control unit 123 of the image forming apparatus 120 closes the browser screen 321 and displays the application mode screen 310.

As described above, in the image processing system of this embodiment, the job setting to the external apparatus 110 is made by inputting second job set values into the setting screen, which is displayed on the operation unit 126 of the image forming apparatus 120 by using a screen resource in the external apparatus 110. The second job set values are stored into the storage unit 112 of the external apparatus 110.

The above-described construction is advantageous in that functions provided by the external apparatus 110 on the second job set value setting screen can be expanded independently of programs running on the image forming apparatus 120. As an example of expansion of the functions, there can be mentioned upgrading of the version of a control program or a web page for the image processing function. Since a shift is made from the first job set value setting screen (application mode screen 310) to the second job set value setting screen (browser screen 321), it becomes easy for the user to understand that job settings on these setting screens are performed for one print job.

In the following, specific examples of job settings (image processing) will be described. First, a description will be given of image processing performed in a case where the image movement button 312 on the application mode screen 310 is pressed.

Figure 3A:
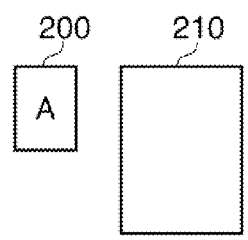
FIG. 3A is a view showing image data and a sheet.

FIGS. 3A to 3F schematically show image processing for image movement. In FIG. 3A, reference numeral 200 denotes image data, and 210 denotes a sheet on which the image data 200 is printed. When the image movement button 312 is pressed, there is displayed an image movement setting screen (not shown) on which it is possible to set at which of the upper left, upper right, lower left, lower right, and center of the sheet 210 the image data 200 should be positioned.

Figures 3B, 3C, 3D, 3E, 3F:
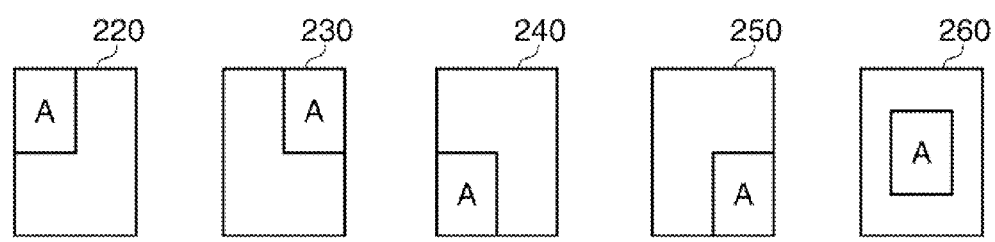
FIGS. 3B to 3F are views showing print results.

If the setting is to position the image 200 at the upper left on the sheet 210, the control unit 123 of the image forming apparatus 120 controls printing such that an upper left corner coordinate of the image data 200 is aligned with that of the sheet 210 as shown by a print result 220 in FIG. 3B. If the setting is to position the image 200 at the upper right on the sheet 210, the control unit 123 controls printing such that an upper right corner coordinate of the image data 200 is aligned with that of sheet 210 as shown by a print result 230 in FIG. 3C. If the setting is to position the image 200 at the lower left on the sheet 210, the control unit 123 controls printing such that a lower left corner coordinate of the image data 200 is aligned with that of the sheet 210 as shown by a print result 240 in FIG. 3D. If the setting is to position the image 20C at the lower right on the sheet 210, the control unit 123 controls printing such that a lower right corner coordinate of the image data 200 is aligned with that of the sheet 210 as shown by a print result 240 in FIG. 3E. If the setting is to position the image 200 at the center on the sheet 210, the control unit 123 controls printing such that a center coordinate of the image data 200 is aligned with that of the sheet 210 as shown by a print result 250 in FIG. 3F.

The print settings shown in FIGS. 3B to 3F can each be established by the control unit 123 by calculating coordinates based on the image size of the image data 200 and the sheet size of the sheet 210 and by transferring to the image forming unit 125 pieces of information (obtained by the coordinate calculation) about print positions in the main scanning direction and sub-scanning direction, but this is not limitative. For example, the control unit 123 is able to overwrite the image data 200 on an image memory having an image size corresponding to the size of the sheet 210 and transfer the overwritten image data to the image forming unit 125.

Next, a description will be given of image processing performed in a case where the page print/image combine button 322 on the browser screen 321 of the expansion mode screen 320 is pressed.

Figure 4A:
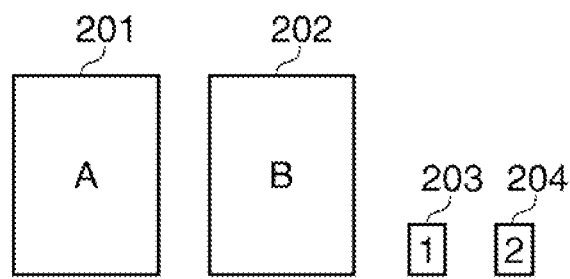
FIG. 4A is a view showing image data and page number images.
Figure 4B:
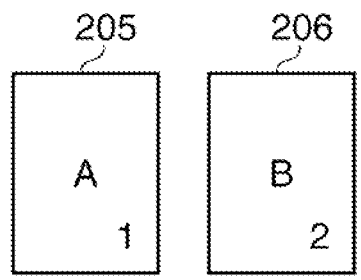
FIGS. 4B and 4C are views showing print results.
Figure 4C:
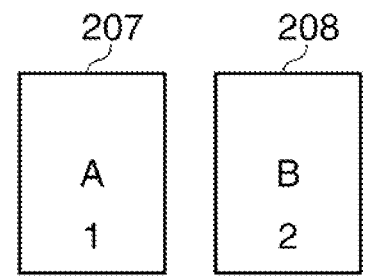

FIGS. 4A to 4C schematically show image processing for page print/image combining. In FIG. 4A, reference numerals 201, 202 respectively denote image data for images "A" and "B." The image data 201, 202 respectively correspond to image data of first and second sheets read by the image input unit 124. Reference numerals 203, 204 respectively denote page number images that represent page numbers "1" and "2" used for page print/image combining. The page numbers "1" and "2" represent first and second pages, respectively.

When the page print/image combine button 322 is pressed, there is displayed a page print/image combine setting screen (not shown) on which it is possible to set, e.g., a position where each page number image is combined with the corresponding image data and the size of page number images. In this example, the page number image 203 is combined with the image data 201, and the page number image 204 is combined with the image data 202.

FIG. 4B shows combined results 205, 206 obtained when the page number image is combined at a lower right position and large in size. FIG. 4C shows combined results 207, 208 when the page number image is combined at a lower center position and small in size. As shown in FIGS. 4B and 4C, the control unit 113 performs page print/image combining, while enlarging or reducing the page number image in size and changing the position where each page number image is combined with image data according to the page print/image combine setting. Items of the page print/image combining can include the color and form of page number images other than the size and combined position thereof.

Figure 5:
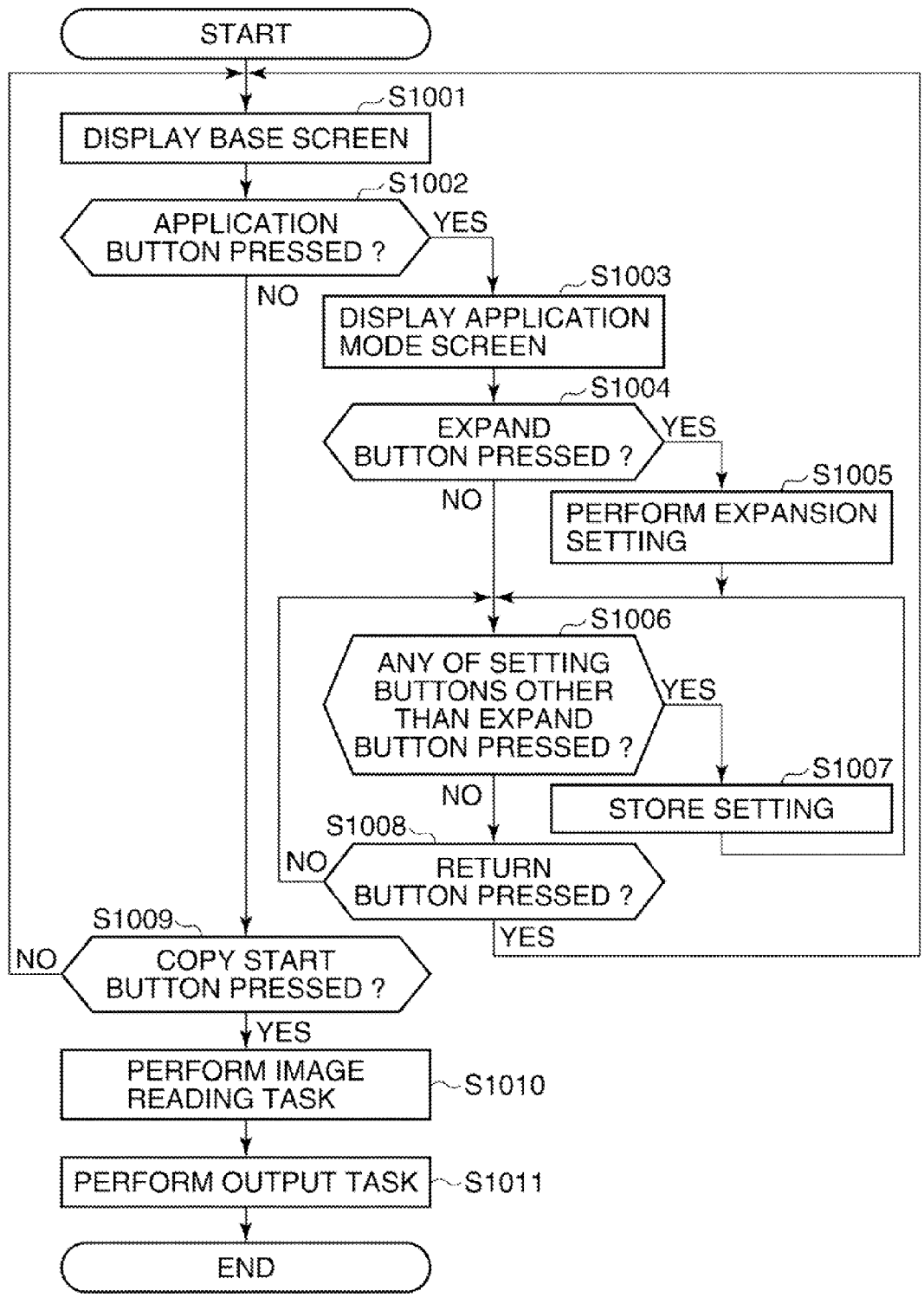
FIG. 5 A flowchart showing a job setting process performed by the image forming apparatus.

FIG. 5 shows in flowchart procedures of a job setting process performed by the image forming apparatus 120. First, the control unit 123 displays the base screen 300 (step S1001), and then determines whether the application button 303 is pressed (step S1002). If the application button 303 is pressed (i.e., if YES to S1002), the process proceeds to step S1003. If the button 303 is not pressed (i.e., if NO to S1002), the process proceeds to step S1009.

In step S1003, the control unit 123 reads the application mode screen 310 from the storage unit 122 and causes the operation unit 126 to display the screen 310. Then, the control unit 123 determines whether the expand button 314 is pressed (step S1004). If the expand button 314 is pressed (i.e., if YES to S1004), the process proceeds to step S1005. If the button 314 is not pressed (i.e., if NO to S1004), the process proceeds to step S1006.

In step S1005, the control unit 123 sets second job set values (i.e., performs an expansion setting), and proceeds to step S1006. The details of the expansion setting performed in step S1005 will be described later with reference to FIG. 6. In step S1006, the control unit 123 determines whether any of buttons associated with first job set values, other than the expand button 314, is pressed. If any of the buttons other than the expand button 314 is pressed (i.e., if YES to S1006), the process proceeds to step S1007. If such a button is not pressed (i.e., if NO to S1006), the process proceeds to step S1008.

In a case, for example, that it is determined in S1006 that the image movement button 312 is pressed, the setting for image movement is performed as previously described with reference to FIG. 3, and the control unit 123 stores the image movement setting into the storage unit 122 (step S1007), whereupon the process returns to step S1006. In step S1008, the control unit 123 determines whether the return button 315 is pressed. If the button 315 is pressed (i.e., if YES to S1008), the process returns to step S1001. If the button 315 is not pressed (i.e., if NO to S1008), the process returns to step S1006. Thus, the job setting relating to the first job set values and the job setting relating to the second job set values are performed.

In step S1009, the control unit 123 determines whether a copy start button (not shown) on the operation unit 126 is pressed. If the copy start button is pressed (i.e., if YES to S1009), the process proceeds to step S1010. If the copy start button is not pressed (i.e., if NO to S1009), the process returns to step S1001. In step S1010, the control unit 123 performs processing (image reading task) to cause the image input unit 124 to read an original and store read image data into the storage unit 122. Next, the control unit 123 performs processing (output task) to read the image data from the storage unit 122 and cause the image forming unit 125 to perform printing (step S1011), whereupon the present process is completed.

Figure 6:
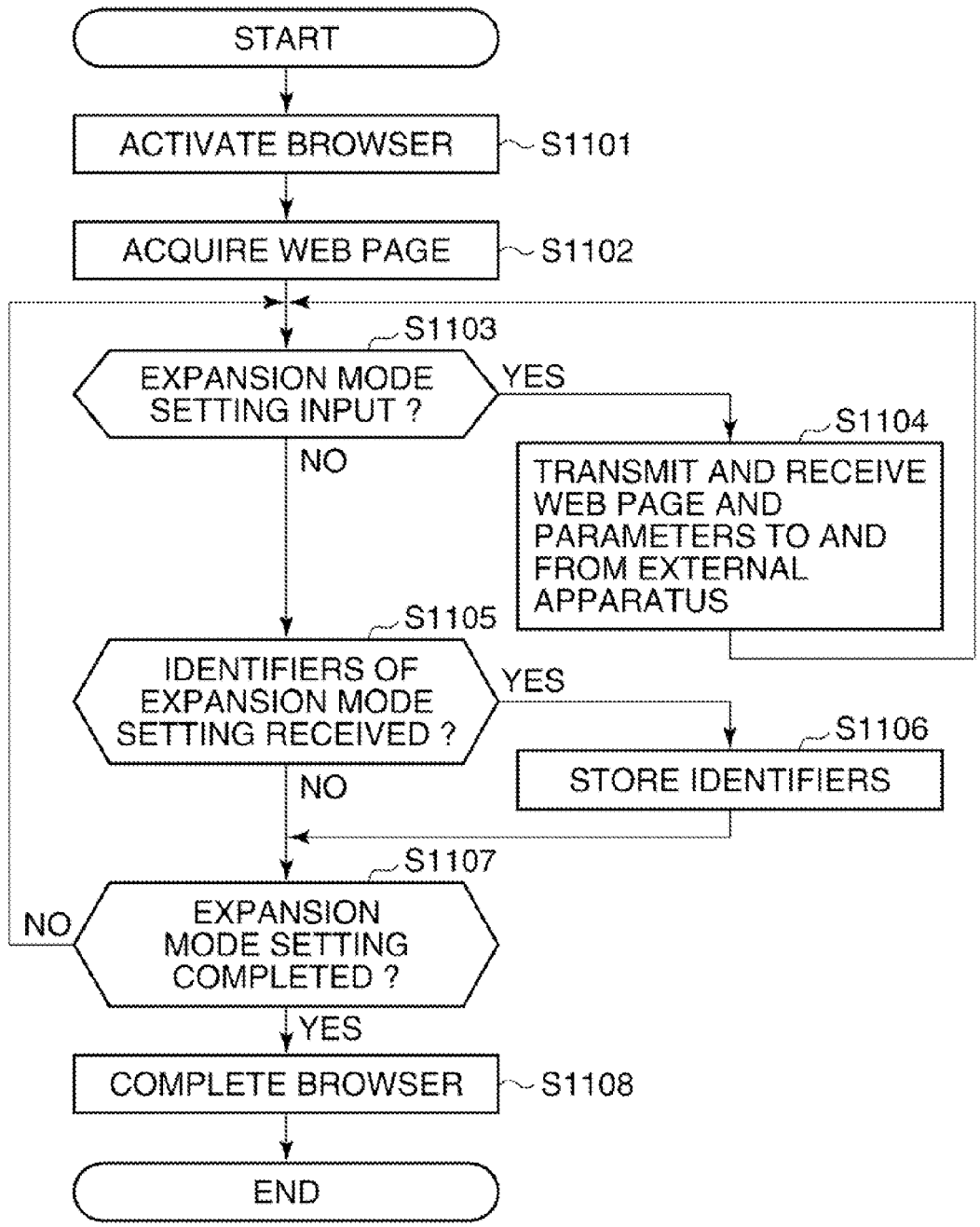
FIG. 6 A flowchart showing the details of expansion setting performed in the job setting process.

FIG. 6 shows in flowchart the procedures of the expansion setting (i.e., the second job set values setting in the image forming apparatus 120) performed in step S1005 of the job setting process shown in FIG. 5. When the expand button 314 is pressed, the control unit 123 reads and executes a web browser stored in the storage unit 122, thereby causing the operation unit 126 to display the expansion mode screen 320 (step S1101). Then, the control unit 123 requests the control unit 113 of the external apparatus 110 to transmit a web page for a top screen used for the expansion setting, and causes the acquired web page to be displayed as the browser screen 321 shown in FIG. 2 (step S1102).

Next, the control unit 123 determines whether an expansion mode setting is input to the browser screen 321 (step S1103). The input of expansion mode setting refers to, e.g., the page print/image combine button 322 or the form combine button 323 being pressed on the browser screen 321.

If the expansion mode setting is input (i.e., if YES to S1103), a web page that corresponds to a button pressed in order to input the expansion mode setting (e.g., a page print setting screen or an image form combine setting screen) is acquired from the external apparatus 110 (step S1104). When second job set values are input to the setting screen, the process returns to step S1103. If it is determined in step S1103 that e.g., the page print/image combine button 322 is pressed, the control unit 123 requests the external apparatus 110 to transmit a web page for page print/image combine screen (not shown), and causes the web page acquired from the external apparatus 110 to be displayed on the browser screen 321. When set values for page print/image combining previously described with reference to FIGS. 4A to 4C are input to the page print/image combine screen, the set values are transmitted to the external apparatus 110 (step S1104).

If the expansion mode setting is not input to the browser screen 321 (i.e., if NO to S1103), the control unit 123 determines whether it receives identifiers of the expansion mode setting (step S1105). The identifiers are for associating second job set values stored into the storage unit 112 by the control unit 113 of the external apparatus 110 with an image processing request from the image forming apparatus 120 to the external apparatus 110. The details of identifiers will be described later. The control unit 123 cooperates with the network communication unit 121 to serve as an identifier reception unit that receives identifiers of the expansion mode setting from the external apparatus 110. When identifiers of the expansion mode setting are received (YES to S1105), the process proceeds to step S1106. When identifiers are not received (NO to S1105), the process proceeds to step S1107.

In step S1106, the control unit 123 stores the received identifiers of expansion mode setting into the storage unit 122, whereupon the process proceeds to step S1107. In step S1107, the control unit 123 determines whether the return button 325 is pressed. If the button 325 is pressed (i.e., if YES to S1107), the process proceeds to step S1108. If the button 325 is not pressed (i.e., if NO to S1107), the process returns to step S1103. In step S1108, the control unit 123 completes the web browser and makes a changeover from the expansion mode screen 320 to the application mode screen 310, whereupon the present process is completed.

Figure 7:
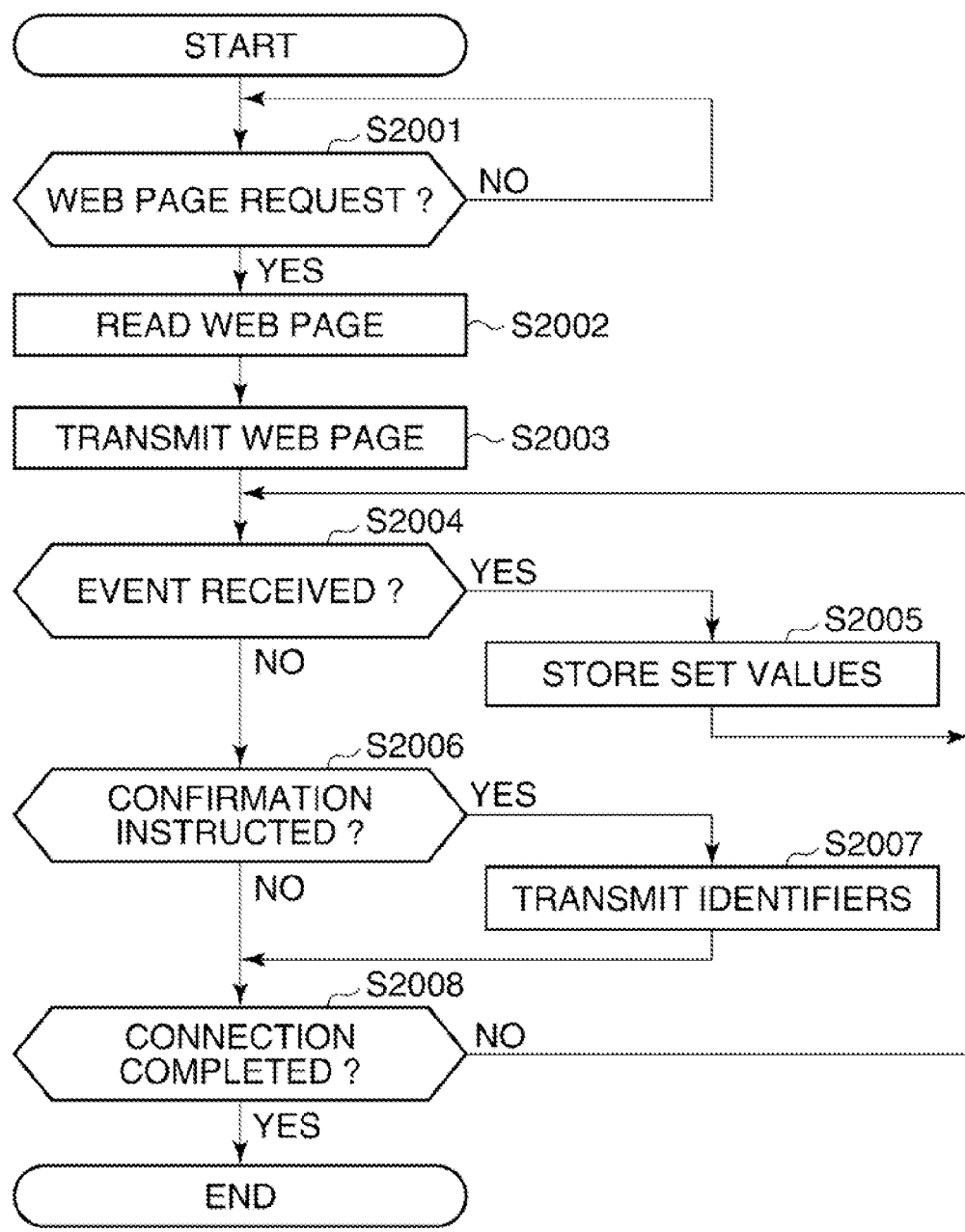
FIG. 7 A flowchart showing a process for setting second job set values, which is performed by an external apparatus of the image processing system.

FIG. 7 shows in flowchart a process for setting second job set values, which is performed by the external apparatus 110. The control unit 113 of the external apparatus 110 cooperates with the network communication unit 111 to function as a request reception unit that receives a web page request (see, S1102 in FIG. 6) from the image forming apparatus 120. The control unit 113 determines whether it receives a web page request from the image forming apparatus 120 (step S2001).

When not receiving a web page request (i.e., if NO to S2001), the control unit 113 waits for reception thereof. When receiving a web page request (i.e., if YES to S2001), the process proceeds to step S2002. In step S2002, the control unit 113 functioning as a web page transmission unit reads from the storage unit 112 a web page for a top screen used for the expansion setting. Then, the control unit 113 transmits the web page to the image forming apparatus 120 (step S2003).

Next, the control unit 113 determines whether it receives an event for the web page from the image forming apparatus 120 (step S2004). For example, in the example shown in FIG. 2, the event for the web page refers to the page print/image combine button 322 or the form combine button 323 being pressed.

When receiving an event (i.e., if YES to S2004), the control unit 113 transmits to the image forming apparatus 120 a web page corresponding to a pressed button. Next, job set values are input to a web page for page print/form combine setting screen displayed on the display unit 126 of the image forming apparatus 120, and are transmitted from the image forming apparatus 120. When receiving the job set values, the control unit 113 functioning as a job set value storage unit stores the received job set values into the storage unit 112 (step S2005), whereupon the process returns to step S2004. In a case, for example, that the page print/image combine button 322 is pressed on the web page for top screen, the control unit 113 transmits a web page for page print/image combine screen (not shown) to the image forming apparatus 120, and then receives from the image forming apparatus 120 a setting of page print/image combining previously described with reference to FIG. 4, and stores the setting into the storage unit 112.

When not receiving an event (NO to S2004), the control unit 113 determines whether it receives from the image forming apparatus 120 an event indicating the confirm button 324 of the image forming apparatus 120 being pressed (step S2006). If the control unit 113 receives an event indicating the confirm button 324 being pressed (i.e., if YES to S2006), the process proceeds to step S2007. If the control unit 113 does not receive the event (i.e., if NO to S2006), the process to step S2008.

In step S2007, the control unit 113 assigns identifiers for identifying second job set values stored into the storage unit 112 in step S2005 to respective ones of second job set values, and stores the identifiers into the storage unit 112. The control unit 113 functioning as an identifier transmission unit transmits the identifiers to the image forming apparatus 120, and proceeds the process to step S2008. In step S2008, the control unit 113 determines whether connection with the image forming apparatus 120 is disconnected. If the connection is disconnected (i.e., if YES to S2008), the present process is completed. If the connection is not disconnected (i.e., if NO to S2008), the process returns to step S2004.

Figure 8:
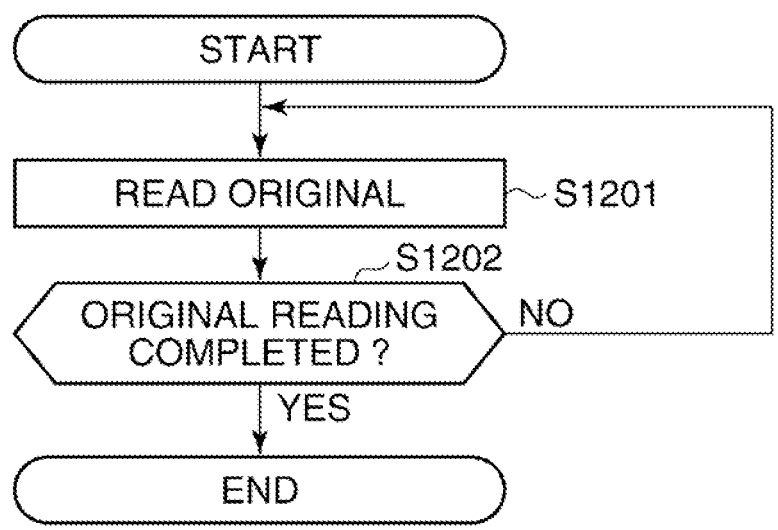
FIG. 8 A flowchart showing procedures of an image reading task performed in the job setting process shown in FIG. 5.

FIG. 8 shows in flowchart the procedures of the image reading task performed by the image forming apparatus 120 in step S1010 of the job setting process (see FIG. 5). The control unit 123 of the image forming apparatus 120 controls the image input unit 124 to start reading an original document and stores read image data into the storage unit 122 (step S1201). Then, the control unit 123 determines whether the last original has been read (step S1202). If image data of the last original has not been read (i.e., if NO to S1202), the process returns to S1201. If the original reading is completed (i.e., if YES to S1202), the control unit 123 completes the present process.

FIG. 9 shows in flowchart the procedures of the output task performed by the image forming apparatus 120 in step S1011 of the job setting process (see FIG. 5). First, the control unit 123 reads image data of one page from the storage unit 122 (step S1301).

Next, the control unit 123 determines whether identifiers have been stored into the storage unit 122 in step S1106 (see FIG. 6) of the job setting process to thereby determine whether the expansion setting has been made (step S1302). If the expansion setting has been made (i.e., if YES to S1302), the process proceeds to step S1303. If the expansion setting has not been made (i.e., if NO to S1302), the process proceeds to step S1307.

In step S1303, the control unit 123 determines whether an image processing request has been issued to the external apparatus 110. If an image processing request has not been issued (i.e., if NO to S1303), the process proceeds to step S1304. If an image processing request has been issued (i.e., if YES to S1303), the process proceeds to step S1305. After the image data of the first page is read in step S1301, the answer to step S1303 becomes NO. For image data of the second page and subsequent pages, the answer to step S1303 becomes YES and step S1304 is skipped.

In step S1304, the control unit 123 reads identifiers from the storage unit 122 and transmits the identifiers to the external apparatus 110, thereby making an image processing request, whereupon the process proceeds to step S1305.

In step S1305, the control unit 123 reads from the storage unit 122 image data stored into the storage unit 122 in S1201 (see FIG. 8)) of the job setting process, and transmits the image data to the external apparatus 110. Then, the control unit 123, which cooperates with the network communication unit 121 to function as an image data reception unit, receives from the external apparatus 110 image data processed by the external apparatus 110 (step S1306), whereupon the process proceeds to step S1307. In the image processing by the external apparatus 110, the control unit 113 of the external apparatus 110 creates image data based on the page print/image combine setting received from the image forming apparatus 120, as previously described with reference to FIG. 7. The details of the image processing will be described later with reference to FIG. 10.

In step S1307, the control unit 123 performs image processing on the image data received from the external apparatus 110 based on first job set values stored in step S1007 (see FIG. 5). In a case, for example, that the setting for image movement has been made, image processing for image movement is performed as described with reference to FIGS. 3 and 5.

Next, the control unit 123 controls the image forming unit 125 to print image data on a sheet (step S1308), and determines whether printing for all the pages is completed (step S1309). It printing for all the pages is not completed (i.e., if NO to S1309), the process return to step S1301. If printing for all the pages is completed (i.e., if YES to S1309), the process proceeds to step S1310.

In step S1310, the control unit 123 determines whether identifiers have been stored into the storage unit 122 in step S1106 (see FIG. 6) of expansion setting in the job setting process to thereby determine whether the expansion setting has been made. If the expansion setting has been made (i.e., if YES to S1310), the process proceeds to step S1311. If the expansion setting has not been made (i.e., if NO to S1310), the process is completed. In step S1311, the control unit 123 notifies the external apparatus 110 of completion of the image processing request, and completes the present process.

FIG. 10 shows in flowchart image processing performed by the external apparatus 110 based on second job set values. First, the control unit 113 of the external apparatus 110 determines whether it receives an image processing request transmitted from the control unit 123 of the image forming apparatus 120 in step S1304 (see FIG. 9) of the output task in the job setting process (step S2101). If the control unit 113 receives an image processing request (i.e., if YES to S2101), the process proceeds to step S2102. If the control unit 113 does not receive an image processing request (i.e., if NO to S2101), it waits for reception thereof. In step S2102, the control unit 113 reads from the storage unit 112 second job set values (page print/image combine setting values in this example) corresponding to received identifiers.

Next, the control unit 113 receives image data from the image forming apparatus 120 (step S2103), and performs image processing on the image data based on second job set values (step S2104). After completion of the image processing, the control unit 113 functioning as an image data transmission unit transmits the processed image data to the image forming apparatus 120 (step S2105).

After a printing process in the image forming apparatus 120 is subsequently completed, the control unit 123 of the image forming apparatus 120 notifies completion of the image processing request to the external apparatus 110 (see FIG. 9). The control unit 113 of the external apparatus 110 determines whether it receives a notification of completion of the image processing request from the image forming apparatus 120 (step S2106). When the control unit 113 receives the completion notification (i.e., if YES to S2106), the present process is completed. When the control unit 113 does not receive the completion notification (i.e., if NO to S2106), the process returns to step S2103.

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

REFERENCE SIGNS LIST

110 External apparatus
113 Control unit of external apparatus
120 Image forming apparatus
123 Control unit of image forming apparatus
126 Operation unit
310 Application mode screen
320 Expansion mode screen

The invention claimed is:

1. An image forming apparatus configured to be capable of being connected with an external apparatus through a network, comprising:
a first setting unit configured to set a first set value relating to image processing to be executed by the image forming apparatus;
a reception unit configured to receive from the external apparatus a web page for setting a second set value relating to image processing to be executed by the external apparatus;
a display unit configured to display the web page received by the reception unit;
a second setting unit configured to set a second set value in accordance with an instruction input by a user through the web page displayed on the display unit;
a first transmission unit configured to transmit to the external apparatus the second set value set by the second setting unit;
an identifier reception unit configured to receive from the external apparatus an identifier associated with the second set value transmitted by the first transmission unit;
a second transmission unit configured to transmit, to the external apparatus, data to be image processed by the external apparatus and the identifier received by the identifier reception unit; and
an image forming unit configured to form an image of the data image processed by the external apparatus based on the second set value and image processed by the image forming apparatus based on the first set value set by the first setting unit.

2. The image forming apparatus according to claim 1, wherein the first set value is set through a setting screen displayed on the image forming apparatus, and the reception unit receives the web page from the external apparatus in response to a predetermined button being selected on the setting screen.

3. An external apparatus configured to be capable of being connected with an image forming apparatus through a network, comprising:
a request reception unit configured to receive a web page request from the image forming apparatus;
a web page transmission unit configured, in a case where the request reception unit receives the web page request, to transmit to the image forming apparatus a web page for setting a set value relating to image processing to be executed by the external apparatus;
a storage unit configured, when the set value set by a user in the image forming apparatus through the web page is received from the image forming apparatus, to store the set value in association with a predetermined identifier;
an identifier transmission unit configured to transmit an identifier to the image forming apparatus;
a data reception unit configured to receive from the image forming apparatus the identifier and data to be image processed by the external apparatus;
an image processing unit configured to image process the data received by the data reception unit based on the set value associated with the identifier; and
a data transmission unit configured to transmit the data image processed by the image processing unit to the image forming apparatus.

4. An image processing system comprising:
an image forming apparatus configured to be capable of being connected with an external apparatus through a network, comprising:
a first setting unit configured to set a first set value relating to image processing to be executed by the image forming apparatus;
a reception unit configured to receive from the external apparatus a web page for setting a second set value relating to image processing to be executed by the external apparatus;
a display unit configured to display the web page received by the reception unit;
a second setting unit configured to set a second set value in accordance with an instruction input by a user through the web page displayed on the display unit;
a first transmission unit configured to transmit to the external apparatus the second set value set by the second setting unit;
an identifier reception unit configured to receive from the external apparatus an identifier associated with the second set value transmitted by the first transmission unit;
a second transmission unit configured to transmit, to the external apparatus, data to be image processed by the external apparatus and the identifier received by the identifier reception unit; and
an image forming unit configured to form an image of the data image processed by the external apparatus based on the second set value and image processed by the image forming apparatus based on the first set value set by the first setting unit; and the external apparatus comprising:

a request reception unit configured to receive a web page request from the image forming apparatus;

a web page transmission unit configured, in a case where the request reception unit receives the web page request, to transmit to the image forming apparatus a web page for setting a set value relating to image processing to be executed by the external apparatus;

a storage unit configured, when the set value set by a user in the image forming apparatus through the web page is received from the image forming apparatus, to store the set value in association with a predetermined identifier;

an identifier transmission unit configured to transmit an identifier to the image forming apparatus;

a data reception unit configured to receive from the image forming apparatus the identifier and data to be image processed by the external apparatus;

an image processing unit configured to image process the data received by the data reception unit based on the set value associated with the identifier;

a data transmission unit configured to transmit the data image processed by the data reception unit based on the input value associated with the identifier; and a data transmission unit configured to transmit the data image processed by the image processing unit to the image forming apparatus.

5. An image processing method performed by an image forming apparatus configured to be capable of being connected with an external apparatus through a network, comprising:

a first setting step of performing setting of a first set value relating to image processing to be executed by the image forming apparatus;

a reception step of receiving from the external apparatus a web page for setting a second set value relating to image processing to be executed by the external apparatus;

a display step of displaying the web page received in the reception step;

a second setting step of performing setting of a second set value in accordance with an instruction input by a user through the web page displayed in the display step;

a first transmission step of transmitting to the external apparatus the second set value set in the display step;

an identifier reception step of receiving from the external apparatus an identifier associated with the second set value;

a second transmission step of transmitting, to the external apparatus, data to be image processed by the external apparatus and the identifier received in the identifier reception step; and an image forming step of forming an image of data image processed by the external apparatus based on the second set value and image processed by the image forming apparatus based on the first set value set in the first setting step.

6. An image processing method performed by an external apparatus configured to be capable of being connected with an image forming apparatus through a network, comprising:

a request reception step of receiving a web page request from the image forming apparatus;

a web page transmission step of, in a case where the web page request is received in the request reception step, transmitting to the image forming apparatus a web page for setting a set value relating to image processing to be executed by the external apparatus;

a storage step of, when the set value set by a user in the image forming apparatus through the web page is received from the image forming apparatus, storing the set value in association with a predetermined identifier;

an identifier transmission step of transmitting an identifier to the image forming apparatus;

a data reception step of receiving from the image forming apparatus the identifier and data to be image processed by the external apparatus;

an image processing step of image processing the data received in the data reception step based on the set value associated with the identifier; and a data transmission step of transmitting the data image processed in the image processing step to the image forming apparatus.

7. An image processing method for an image processing system in which an image forming apparatus and an external apparatus are capable of being connected for communication with each other, the image processing method comprising:

a first setting step of performing setting of a first set value relating to image processing to be executed by the image forming apparatus;

a reception step of receiving from the external apparatus a web page for setting a second set value relating to image processing to be executed by the external apparatus;

a display step of displaying the web page received in the reception step;

a second setting step of performing setting of the second set value in accordance with an instruction input by a user through the web page displayed in the display step;

a first transmission step of transmitting to the external apparatus the second set value set in the display step;

an identifier reception step of receiving from the external apparatus an identifier associated with the second set value;

a second transmission step of transmitting, to the external apparatus, data to be image processed by the external apparatus and the identifier received in the identifier reception step;

an image forming step of forming an image of data image processed by the external apparatus based on the second set value and image processed by the image forming apparatus based on the first set value set in the first setting step;

a request reception step of receiving a web page request from the image forming apparatus;

a web page transmission step of, in a case where the web page request is received in the request reception step, transmitting to the image forming apparatus a web page for setting a set value relating to image processing to be executed by the external apparatus;

a storage step of, when the set value set by a user in the image forming apparatus through the web page is received from the image forming apparatus, storing the set value in association with a predetermined identifier;

an identifier transmission step of transmitting an identifier to the image forming apparatus;

a data reception step of receiving from the image forming apparatus the identifier and data to be image processed by the external apparatus;

an image processing step of image processing the data received in the data reception step based on the set value associated with the identifier; and a data transmission step of transmitting the data image processed in the image processing step to the image forming apparatus.

8. A non-transitory computer-readable storage medium storing a program for causing a computer to execute the image processing method as set forth in claim 5.

9. A non-transitory computer-readable storage medium storing a program for causing a computer to execute the image processing method as set forth in claim 6.

* * * * *